United States Patent
Brown (10) Patent No.: US 10,725,955 B2
(45) Date of Patent: Jul. 28, 2020

(54) POWER CONTROL OF INTER-DOMAIN TRANSACTION BRIDGE

(71) Applicant: Arm Limited, Cambridge (GB)

(72) Inventor: Dominic William Brown, Ely (GB)

(73) Assignee: Arm Limited, Cambridge, MA (US)

( * ) Notice: Subject to any disclaimer, the term of this patent is extended or adjusted under 35 U.S.C. 154(b) by 207 days.

(21) Appl. No.: 15/835,616

(22) Filed: Dec. 8, 2017

(65) Prior Publication Data

US 2019/0179790 A1    Jun. 13, 2019

(51) Int. Cl.
*G06F 1/00* (2006.01)
*G06F 13/42* (2006.01)
*G06F 13/40* (2006.01)

(52) U.S. Cl.
CPC ...... *G06F 13/4213* (2013.01); *G06F 13/4027* (2013.01)

(58) Field of Classification Search
CPC .............. G06F 13/4213; G06F 13/4027
See application file for complete search history.

(56) References Cited

U.S. PATENT DOCUMENTS

2013/0073878 A1* 3/2013 Jayasimha ............ G06F 1/3287
                                                                  713/300
2016/0091944 A1* 3/2016 Malmberg ............ G06F 1/3203
                                                                  713/320

* cited by examiner

*Primary Examiner* — Xuxing Chen
(74) *Attorney, Agent, or Firm* — Nixon & Vanderhye P.C.

(57) ABSTRACT

A data processing system includes multiple powered domains which communicate using a bridge 10. The bridge 10 includes first bridge circuitry 14 within a first power domain and second bridge circuitry 16 within a second power domain. The first bridge circuitry 14 and the second bridge circuitry 16 exchange intra-bridge power control signals which serve to control management of the communication channel through the bridge 10 to adopt a communication open state or a communication quiesced state independent of whether either side of the bridge is in a power-active state or a power-inactive state.

24 Claims, 9 Drawing Sheets

POWER CONTROL OF INTER-DOMAIN TRANSACTION BRIDGE

BACKGROUND

Technical Field

This disclosure relates to the field of data processing systems. More particularly, this disclosure relates to data processing systems including bridge circuitry for transferring transaction signals between power domains.

Technical Background

It is known to provide data processing systems which operate using multiple power domains which can be subject to separate power control (e.g. powered on, clock stopped, powered off, etc.). It is known to provide bridge circuitry between such power domains for various purposes, such as voltage level matching, accommodating clock frequency differences, supporting asynchronous operation, etc.

SUMMARY

Viewed from one aspect, at least some embodiments of the present disclosure provide an apparatus for processing data comprising:
  a first power domain;
  a second power domain; and
  a bridge to pass transaction signals from said first domain to said second domain and comprising:
    first bridge circuitry within said first power domain and switched between a first-bridge-circuitry power-active state and a first-bridge-circuitry power-inactive state using first-domain power control signals communicated with a first domain power controller; and
    second bridge circuitry within said second power domain and switched between a second-bridge-circuitry power-active state and a second-bridge-circuitry power-inactive state using second-domain power control signals communicated with a second domain power controller; wherein
  said first bridge circuitry and said second bridge circuitry communicate using intra-bridge control signals;
  said intra-bridge power control signals comprise an intra-bridge transaction-active signal passed from said first bridge circuitry to said second bridge circuitry when said first bridge circuitry is in said first-bridge-circuitry power-active state to indicate a transaction-active state corresponding to said first bridge circuitry having received one or more transactions to transfer to said second bridge circuitry since said first bridge circuitry was last in said first-bridge-circuitry power-inactive state; and
  said second bridge circuitry is triggered by said intra-bridge transaction-active signal changing to indicate said transaction-active state to initiate switching of said first bridge circuitry and said second bridge circuitry to a communication open state to transfer transaction from said first bridge circuitry to said second bridge circuitry.

Viewed from another aspect at least some embodiments of the present disclosure provide apparatus for processing data comprising:
  a first power domain;
  a second power domain; and
  means for passing transaction signals from said first domain to said second domain and comprising:
    first bridge means within said first power domain for sending said transaction signals to said second domain and switched between a first-bridge-means power-active state and a first-bridge-means power-inactive state using first-domain power control signals communicated with a first domain power controller; and
    second bridge means within said second power domain for receiving said transaction signals and switched between a second-bridge-means power-active state and a second-bridge-means power-inactive state using second-domain power control signals communicated with a second domain power controller; wherein
  said first bridge means and said second bridge means communicate using intra-bridge control signals;
  said intra-bridge power control signals comprise an intra-bridge transaction-active signal passed from said first bridge means to said second bridge means when said first bridge means is in said first-bridge-means power-active state to indicate a transaction-active state corresponding to said first bridge means having received one or more transactions to transfer to said second bridge means since said first bridge means was last in said first-bridge-means power-inactive state; and
  said second bridge means is triggered by said intra-bridge transaction-active signal changing to indicate said transaction-active state to initiate switching of said first bridge means and said second bridge means to a communication open state to transfer transaction from said first bridge means to said second bridge means.

Viewed from another aspect at least some embodiments of the present disclosure provide a method of operating an apparatus for processing data having a first power domain and a second power domain, said method comprising:
  passing transaction signals with a bridge from said first domain to said second domain;
  sending said transaction signals to said second domain using first bridge circuitry within said bridge;
  switching said first bridge circuitry between a first-bridge-circuitry power-active state and a first-bridge-circuitry power-inactive state using first-domain power control signals communicated with a first domain power controller;
  receiving said transaction signals from said first domain using second bridge circuitry within said bridge; and
  switching said second bridge circuitry between a second-bridge-circuitry power-active state and a second-bridge-circuitry power-inactive state using second-domain power control signals communicated with a second domain power controller; wherein
  communicate between said first bridge circuitry and said second bridge circuitry using intra-bridge control signals; wherein
  said intra-bridge power control signals comprise an intra-bridge transaction-active signal passed from said first bridge circuitry to said second bridge circuitry when said first bridge circuitry is in said first-bridge-circuitry power-active state to indicate a transaction-active state corresponding to said first bridge circuitry having received one or more transactions to transfer to said second bridge circuitry since said first bridge circuitry was last in said first-bridge-circuitry power-inactive state; and
  triggering said second bridge circuitry by said intra-bridge transaction-active signal changing to indicate said transaction-active state to initiate switching of said first bridge circuitry and said second bridge circuitry to a communication open state to transfer transaction from said first bridge circuitry to said second bridge circuitry.

Further aspects, features and advantages of the present technique will be apparent from the following description of examples, which is to be read in conjunction with the accompanying drawings.

DESCRIPTION OF EXAMPLES

Figure 1:
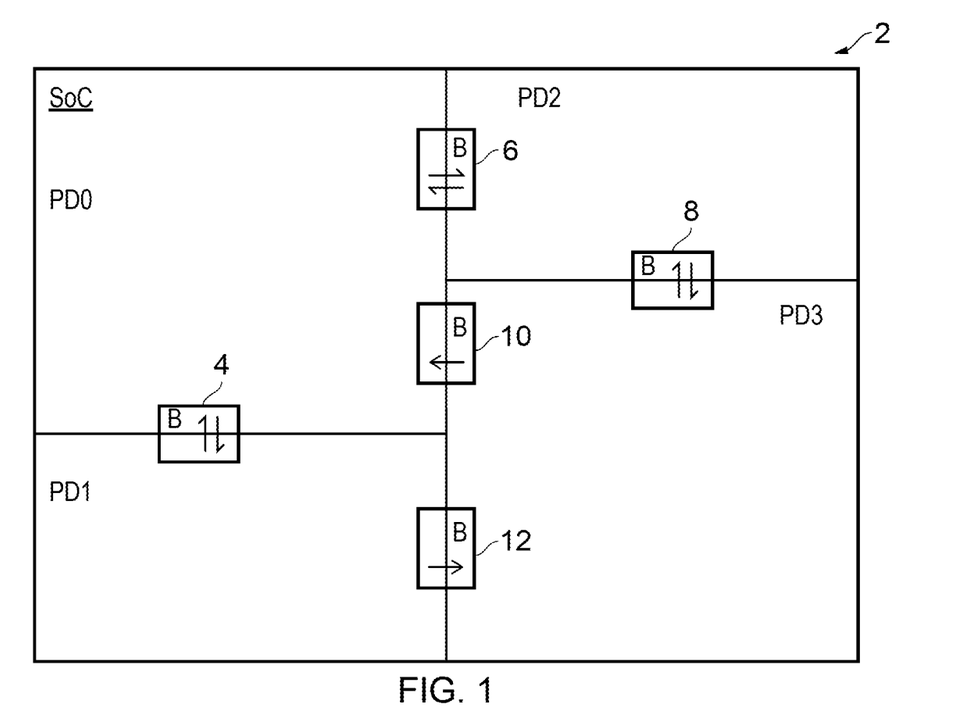
FIG. 1 schematically illustrates a data processing system in the form of a system-on-chip integrated circuit containing multiple power domains.

FIG. 1 schematically illustrates a data processing system 2 in the form of a system-on-chip integrated circuit which comprises multiple power domains PD0, PD1, PD2, PD3. These power domains PD0, PD1, PD2, PD3 are subject to respective independent power control and can be moved between different power states such as power on, power off, clock stopped, body biased, etc. The use of such separate power domains PD0, PD1, PD2, PD3 assists in reducing the power consumption of the data processing system 2 since a portion of the system-on-chip integrated circuit which is not required for the processing operations being performed at a particular point in time may be placed into a low power state and then returned to operation in a high power state when it is actually needed. The different power domains PD0, PD1, PD2, PD3 may operate at different voltages, with different clock frequencies, and/or asynchronously as may be appropriate to their particular functions and the overall design.

In order to pass transaction signals between the domains PD0, PD1, PD2, PD3 there are provided bridges 4, 6, 8, 10, 12. These bridges may pass transaction signals in a single direction, such as bridges 10 or 12, or may pass bridges in both directions, such as bridges 4, 6, 8. For the transfer of transaction signals in a given direction, the bridge can be provided with bridge slave circuitry in a domain which is to send the transaction signals and bridge master circuitry in the domain which is to receive those transaction signals. Such a slave/master arrangement allows differences between the operation on either side of the domain boundary to be accommodated. A bidirectional bridge may include two such arrangements one to pass the transaction signals in a first direction and another to pass the transaction signals in the reverse direction. The present techniques may be used in the case of both unidirectional bridges and bidirectional bridges.

Figure 2:
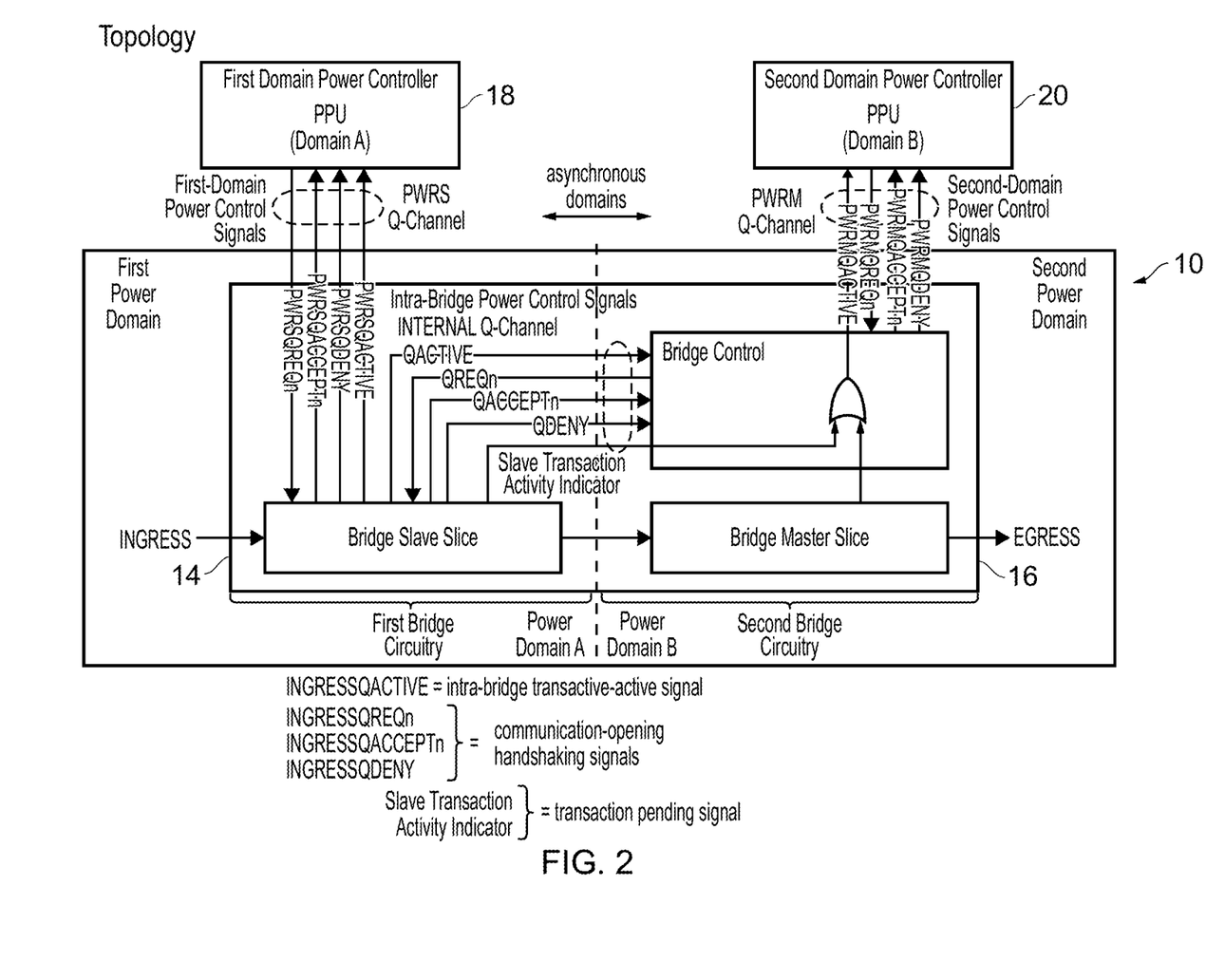
FIG. 2 schematically illustrates the topology of a bridge for passing transaction signals between two power domains.

FIG. 2 schematically illustrates the topology of a unidirectional bridge 10. It will be appreciated that in other example embodiments two such slave/master arrangements may be provided in order to facilitate transactions signals being sent in either direction. As illustrated in FIG. 2, the bridge 10 includes first bridge circuitry 14 located within a first power domain and communicating using first-domain power control signals with a first domain power controller 18. This first bridge circuitry 14 serves to provide a bridge slave slice as part of a slave/master arrangement, as will be familiar to those in this technical field. Second bridge circuitry 16 operates in a second power domain and communicates using second-domain power control signals with a second domain power controller 20. The second bridge circuitry 16 includes a bridge master slice and bridge control circuitry. The bridge control circuitry is responsible for at least part of the processing of intra-bridge power control signals which are exchanged between the first bridge circuitry and the second bridge circuitry 16.

The first-domain power control signals from the first domain power controller 18 are used to control the first bridge circuitry 14 so that it may operate in states including a first-bridge-circuitry power-active state and a first-bridge-circuitry power-inactive state. The first domain power controller 18 may switch the first bridge circuitry 14 from the first-bridge-circuitry power-inactive state to the first-bridge-circuitry power-active state when the first domain has transaction signals to send to the second domain and may also power up or power down the domain for uses other than use of the bridge.

The first domain power controller 18 may at a later time seek to change the first bridge circuitry 14 from being in the first-bridge-circuitry power-active state into the first-bridge-circuitry power-inactive state when there are no more transaction signals to send and it is desired to save power. In this circumstance, the first bridge circuitry 14 and the second bridge circuitry 16 should be moved to a quiesced state before the power down is performed on either side in order to ensure problems do not arise, by providing a restart or reset to a known state. For example, first-in-first-out (FIFO) buffer circuitry may be used to store transaction signals to be transferred. This FIFO buffer may be located, for example, within the bridge slave slice. Such first-in-first-out buffer circuitry will typically use a write pointer to indicate where a next transaction should be written when received within the first power domain and a read pointer to indicate the location from which the next transaction should be read by the bridge master slice within the second power domain. When placing the bridge 10 into a communication quiesced state from a communication open state, part of this process may be to ensure that the first-in-first-out buffer circuitry is empty and then to reset both the write pointer value stored within and used by the first bridge circuitry 14 and the read pointer stored within and used by the second bridge circuitry 16 to predetermined values (such as zero values). When it is desired to return to a communication open state, this predetermined state whereby the write pointer and the read pointer are both known to be zero will help ensure proper operation as new transaction signals are stored within and read from the first-in-first-out buffer circuitry.

The first domain power controller 18 and the second domain power controller 20 are able to independently switch the first bridge circuitry 14 and the second bridge circuitry 16 respectively between power-active and power-inactive states. The inter-bridge power control signals passed between the first bridge circuitry 14 and the second bridge circuitry 16 are used to ensure appropriate transitions between the communication open state of the bridge 10 and the communication quiesced state of the bridge 10 as required by the respective power states of the first power domain and the second power domain and the requirement to, or history of, transaction communication between the domains as will be discussed further below in relations to FIGS. 3 to 9.

The intra-bridge power control signals include an intra-bridge transaction-active signal (INGRESSQACTIVE) which is passed form the first bridge circuitry 14 to the second bridge circuitry 16 when the first bridge circuitry is in the first-bridge-circuitry power-active state and indicates a transaction-active state of the bridge corresponding to the first bridge circuitry 14 having received one or more transactions to transfer to the second bridge circuitry 16 since the first bridge circuitry was last in the first-bridge-circuitry power-inactive state. These transactions may still be buffered within the first bridge circuitry 14, or may have already been sent to the second bridge circuitry 16. If these transactions are the first to be received by the first bridge circuitry 14 since it was switched from the first-bridge-circuitry power-inactive state to the first-bridge-circuitry power-active state, then it is necessary to open the communication between the first bridge circuitry 14 and the second bridge circuitry 16, i.e. move the bridge 10 from a communication quiesced state to a communication open state. This opening of the communication may be achieved using communication-opening hand shaking signals (INGRESSQREQn, INGRESSQACCEPTn, INGRESSQDENY) to coordinate the first bridge circuitry 14 and the second bridge circuitry 16 making this change.

The intra-bridge power control signals shown in FIG. 2 further include a Slave Transaction Activity Indicator which serves as a transaction pending signal indicating that the first bridge circuitry 14 is storing pending transactions yet to be sent to the second bridge circuitry 16. Such a signal may be used in various ways, such as to deny a switch to a quiesced state initiated by the second power domain, to provide a wake-up and activity indication that transactions are pending (but not to actually initiate transactions—this is done with some asynchronous safe protocol with other signaling once in the communication open state), or in other ways. Once the bridge 10 has been switched to the communication open state, the intra-bridge transaction-active signal does not change until the bridge 10 is switched to the communication quiesced state.

Figure 6:
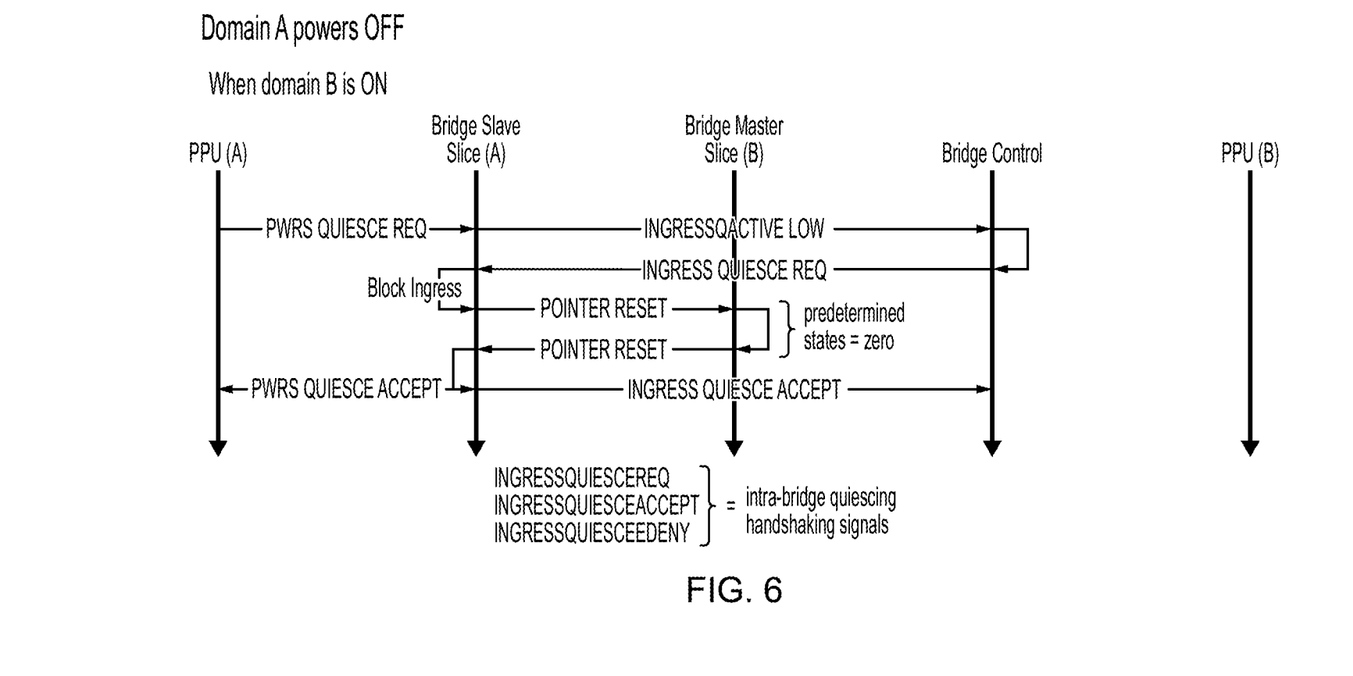

The intra-bridge power control signals further include intra-bridge quiescing handshaking signals (INGRESSQREQn, INGRESSQACCEPTn, INGRESSQDENY) as will be illustrated in, for example, FIG. 6.

The first power domain and the second power domain illustrated in FIG. 2 may operate with asynchronous controlling clock signals, e.g. with different clock frequencies and/or with varying clock phase.

Figure 3:
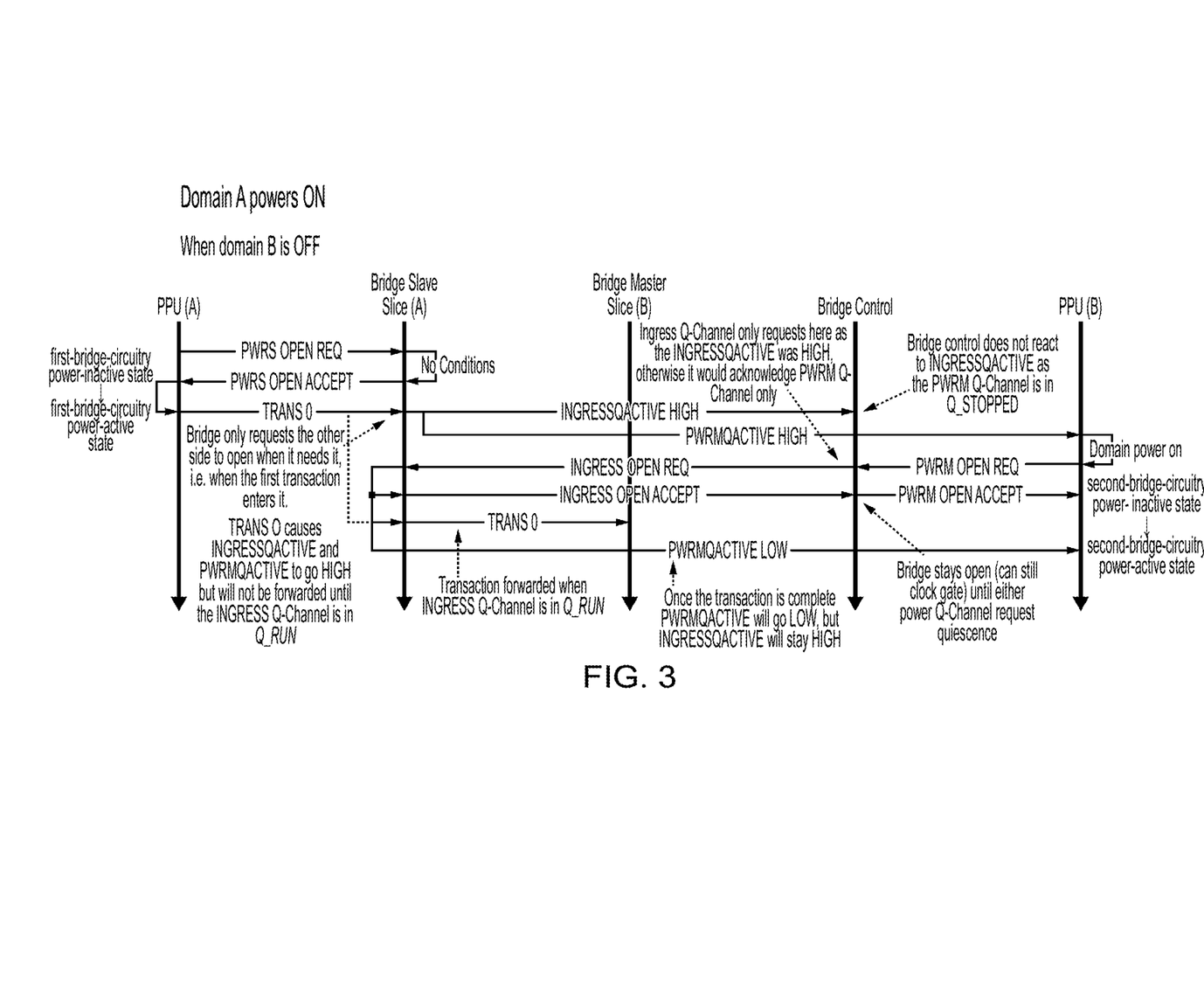
FIGS. 3 to 9 schematically illustrate the operation of the bridge of FIG. 2 in differing combinations of active and inactive states on either side of the bridge and different states corresponding to whether or not transactions have been transferred via the bridge.

FIG. 3 schematically illustrates the use of the intra-bridge power control signals when the first domain powers on and the second domain is powered off. The first domain power controller starts by exchanging handshaking signals using the first domain power control signals which indicate a request to power up and the acceptance of that request directed to the first bridge circuitry 18. The intra-bridge transaction-active signal does not change at this time. At this point, the communication between the first bridge circuitry 14 and the second bridge circuitry 16 remains in a communication quiesced state. The first bridge circuitry 14 then receives the first transaction it is to transfer to the second bridge circuitry 16. At this time, the first bridge circuitry 14 changes the signal level of the intra-bridge transaction-active signal (INGRESSQACTIVE) to indicate that the first bridge circuitry 14 has received one or more transactions to transfer to the second bridge circuitry 16. The transaction pending signal (Slave Transaction Activity Indicator) is also changed to indicate pending signals to transfer and this signal is passed via the second bridge circuitry 16. An OR gate within the bridge control circuitry changes the value of a signal which is part of the second domain power control signals and indicates activity within the second bridge circuitry (namely the PWRMQACTIVE signal). This signal triggers the second domain power controller 20 to switch the second bridge circuitry 16 from a second-bridge-circuitry power-inactive state to a second-bridge-circuitry power-active state, namely power on the second bridge circuitry 16. When the second bridge circuitry 16 is powered on, it serves to initiate an exchange of communication-opening handshaking signals between the second bridge circuitry 16 and the first bridge circuitry 14 namely a request to open the communication with the first bridge circuitry 14 and an acceptance of that request. When the first bridge circuitry 14 has received the opening request and has accepted that request, then the communication channel is open and the one of more transactions which have been received are sent. When the transactions have been sent, then the slave transaction activity indicator (transaction pending signal) will change to indicate no more pending transactions to send and this will be indicated back to the second domain power controller 20 via the second bridge circuitry 16 and the second-domain power control signals. The intra-bridge transaction-active signal does not change and remains indicating the transaction active state.

Figure 4:
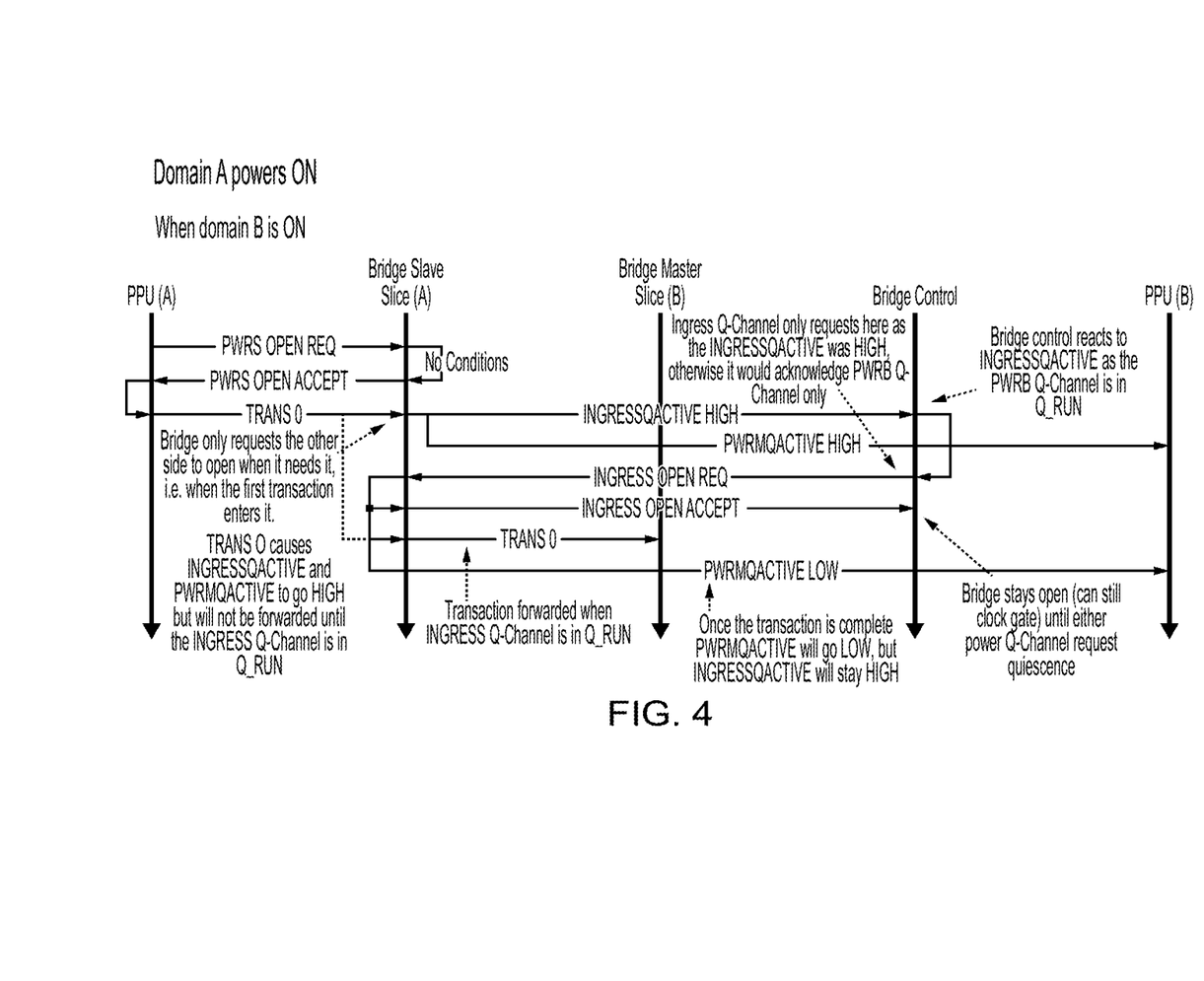

FIG. 4 schematically illustrates the operation of the bridge 10 when the first power domain (A) powers on when the second power domain (B) is already on. This operation is the same as that discussed in relation to FIG. 3 except that in this case as the second power domain is already in a powered on state, namely the second bridge circuitry is in the second-bridge-circuitry power-active state, then when the second bridge circuitry receives the change in the intra-bridge transaction-active signal to indicate that there are transactions to be sent, it responds by initiating the communication-opening handshaking operation without having to wait for the second bridge circuitry 16 to be powered up.

Figure 5:
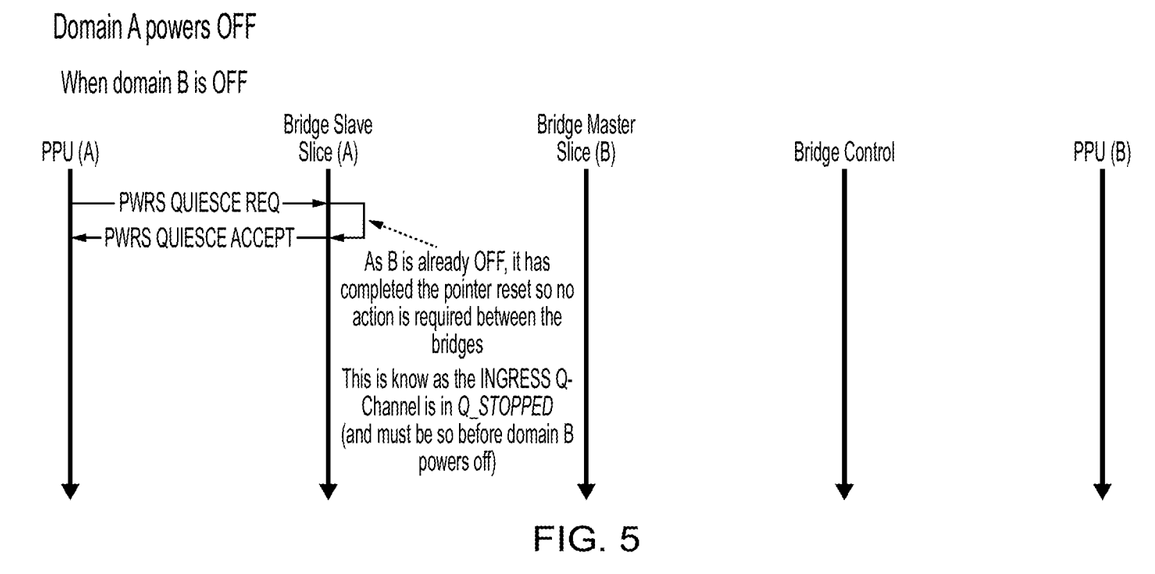

FIG. 5 schematically illustrates operation only when the first power domain powers off when the second power domain is already off. In this situation the first bridge circuitry 14 receives a quiescing request from the first power domain controller 18 and can immediately accept this quiescing request and switch to the inactive state. As the second power domain (B) is already off, then the communication between the first power domain and the second power domain will already be in the communication quiesced state with both the first bridge circuitry 14 and the second bridge circuitry 16 having been placed into predetermined states (e.g. the write pointer and the read pointer for the FIFO have been zeroed).

FIG. 6 schematically illustrates the use of the intra-bridge power control signals in the circumstance where the first power domain (A) powers off when the second power domain (B) is powered on. In this situation the communication between the first bridge circuitry 14 and the second bridge circuitry 16 is in a communication open state and has to be changed to a communication quiesced state before the first power domain is powered off.

As illustrated in FIG. 6, the first bridge circuitry 14 responds to the receipt of the quiesce request from the first domain power controller 18 by changing the signal level of the intra-bridge transaction-active signal to low (assuming there are no pending transactions stored within the first bridge circuitry, in which case quiescing would be denied so these can be sent). The second bridge circuitry 16 reacts to this change in the intra-bridge transaction-active signal by initiating the exchange of intra-bridge quiescing handshaking signals as previously mentioned. These serve to first block acceptance of further transactions by the first bridge circuitry 14, and then reset both the write pointer within the first bridge circuitry 14 and the read pointer within the second bridge circuitry 16. When the read pointer within the second bridge circuitry 16 has been noted as having been reset by the first bridge circuitry 14 due to receipt of the pointer reset signal at the first bridge circuitry 14, then the first bridge circuitry 14 is able to accept the switch to the quiescent state by signalling this to both the second bridge circuitry 16 (ingress quiescent accept) and the first domain power controller 18 (PWRSQACCEPTn).

Figure 7:
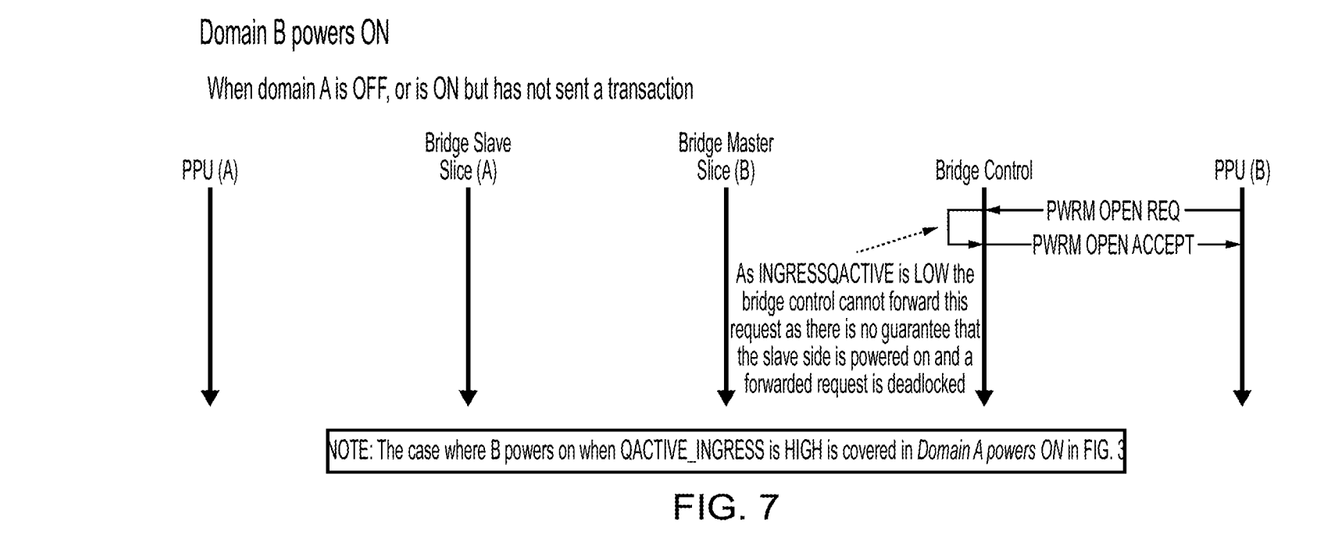

FIG. 7 schematically illustrates the situation in which the second power domain powers on when the first power domain is off, or is on but no transactions have been sent (i.e. the bridge is in the communication quiesced state). As illustrated in FIG. 7, since the communication between the first bridge circuitry 14 and the second bridge circuitry 16 is quiesced (or has not been started), the second bridge circuitry 16 is able to power on without any need to exchange intra-bridge power control circuitry with the first bridge circuitry 14.

Figure 8:
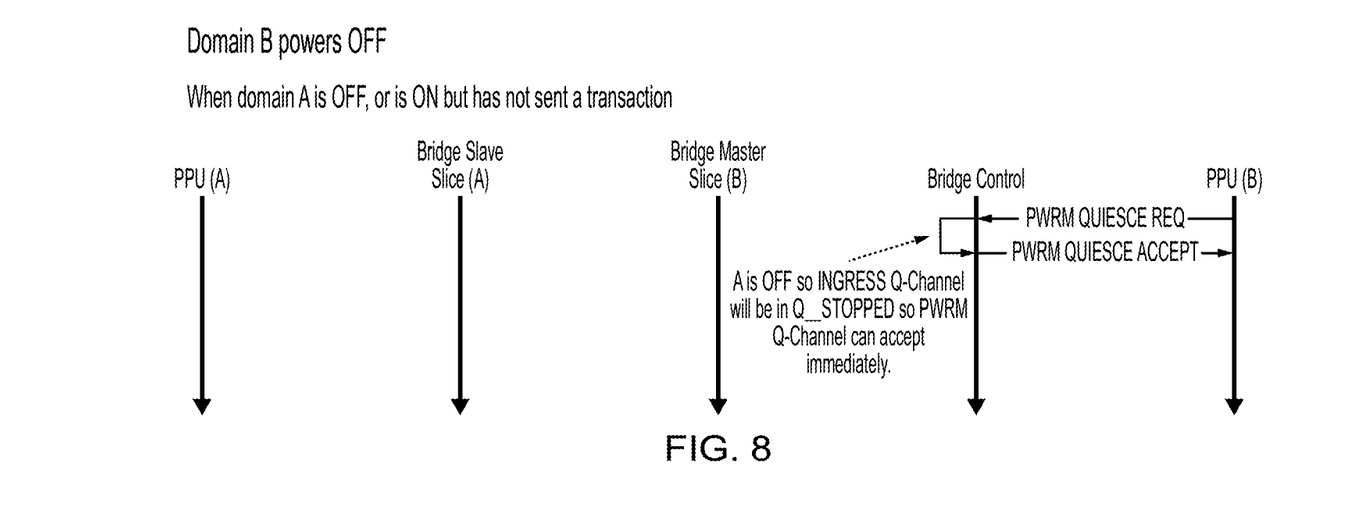

In a similar way, FIG. 8 illustrates the situation in which the second power domain powers off when the first power domain is off, or no transaction has been sent. In this case, the second bridge circuitry is able to indicate the accept the quiescence request without the need to exchange intra-bridge power control signals as the communication between the first bridge circuitry 14 and the second bridge circuitry 16 is already quiesced.

Figure 9:
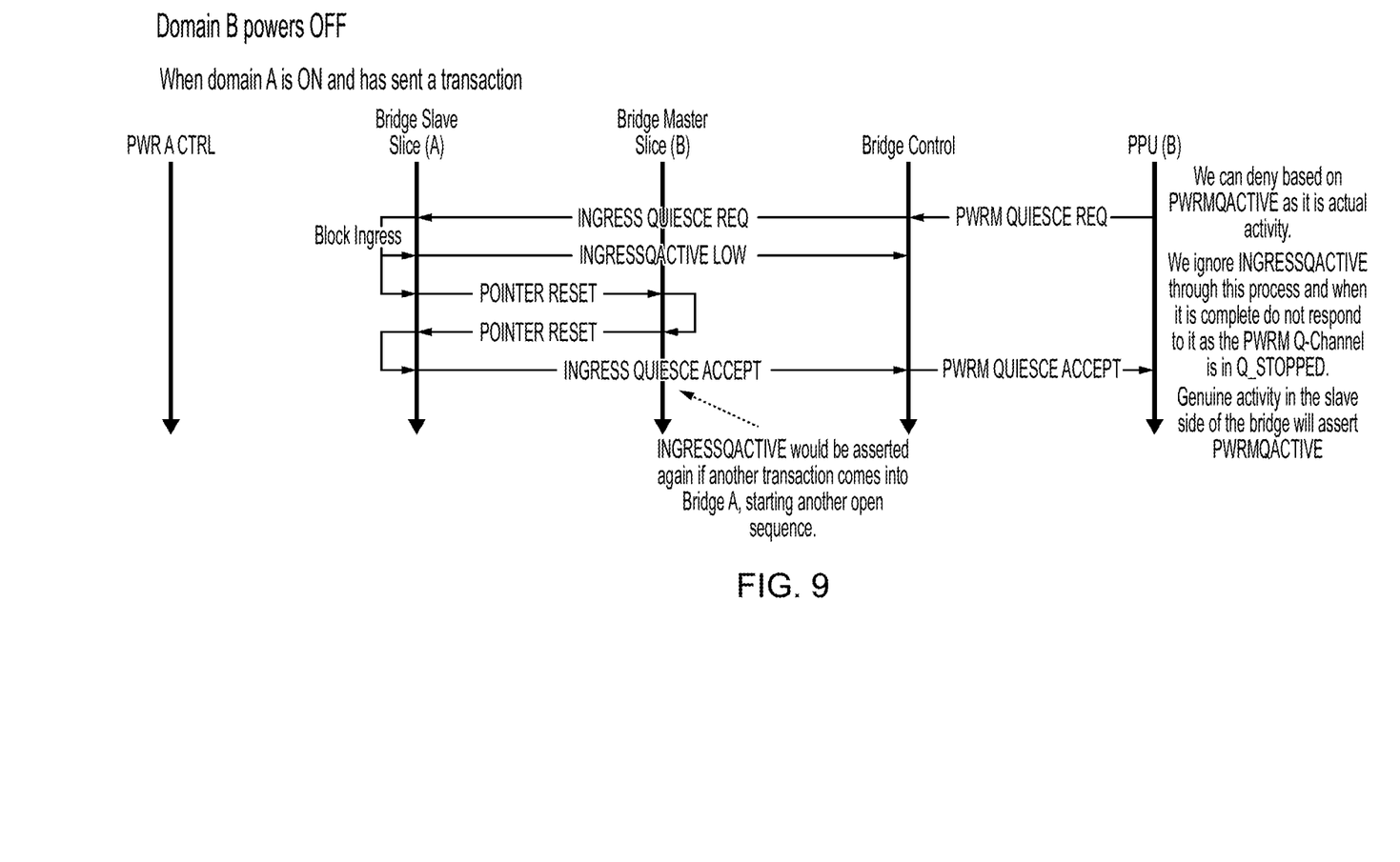

FIG. 9 schematically illustrates the situation in which the second power domain powers off when the first power domain is powered on and a transaction has been sent. This is the circumstance where the communication channel is in the communication open state. This can be indicated by the level of the intra-bridge transaction-active signal being high indicating that one or more transactions have been sent from the first bridge circuitry 14 to the second bridge circuitry 16 since the first bridge circuitry 14 was last in its first-bridge-circuitry power-inactive state.

As illustrated in FIG. 9, receipt of a quiescence request from the second power controller 20 by the second bridge circuitry 16 triggers an exchange of intra-bridge quiescing handshaking signal between the second bridge circuitry 16 and the first bridge circuitry 14 following the same sequence as illustrated in FIG. 6. This resets the read pointer within the second bridge circuitry and the write pointer within the first bridge circuitry 14, thereby placing the bridge into a predetermined state before the quiescence request is accepted by the first bridge circuitry 14. It will be noted that the first bridge circuitry 14 is not powered down at this time, merely the communication channel is changed from a communication open state to a communication quiesced state. More generally, the exchange of the intra-bridge power control signals permits the communication channel to be changed between open and quiesced states independently of the power active or power inactive states on either states either side of the bridge facilitating the independent power management of the separate power domains in a simplified manner.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:
1. Apparatus for processing data comprising:
a first power domain;
a second power domain; and
a bridge to pass transaction signals from said first power domain to said second power domain and comprising:
first bridge circuitry within said first power domain and switched between a first-bridge-circuitry power-active state and a first-bridge-circuitry power-inactive state using first-domain power control signals communicated with a first domain power controller; and
second bridge circuitry within said second power domain and switched between a second-bridge-circuitry power-active state and a second-bridge-circuitry power-inactive state using second-domain power control signals communicated with a second domain power controller; wherein
said first bridge circuitry and said second bridge circuitry communicate using intra-bridge power control signals;
said intra-bridge power control signals comprise an intra-bridge transaction-active signal passed from said first bridge circuitry to said second bridge circuitry when said first bridge circuitry is in said first-bridge-circuitry power-active state to indicate a transaction-active state corresponding to said first bridge circuitry having received one or more transactions to transfer to said second bridge circuitry since said first bridge circuitry was last in said first-bridge-circuitry power-inactive state; and
said second bridge circuitry is triggered by said intra-bridge transaction-active signal changing to indicate said transaction-active state to initiate switching of said first bridge circuitry and said second bridge circuitry to a communication open state to transfer the one or more transactions from said first bridge circuitry to said second bridge circuitry.

2. Apparatus as claimed in claim 1, wherein said intra-bridge transaction-active signal remains indicating said transaction-active state while said first bridge circuitry and said second bridge circuitry are in said communication open state.

3. Apparatus as claimed in claim 1, wherein said intra-bridge power control signals comprise intra-bridge communication-opening handshaking signals to co-ordinate said first bridge circuitry and said second bridge circuitry switching to said communication open state.

4. Apparatus as claimed in claim 3, wherein said intra-bridge communication-opening handshaking signals comprise a communication-open request signal sent from said second bridge circuitry to said first bridge circuitry to trigger said first bridge circuitry to switch to said communication open state and a communication-open accept signal sent from said first bridge circuitry to said second bridge circuitry to indicate that said first bridge circuitry has switched to said communication open state.

5. Apparatus as claimed in claim 3, wherein transfer of said one or more transactions commences when said first bridge circuitry and said second bridge circuitry are in said communication open state.

6. Apparatus as claimed in claim 1, wherein when said second bridge circuitry is in said second-bridge-circuitry power-inactive state and said intra-bridge transaction-active signal changes to indicate said transaction-active state, said second domain power controller is triggered to switch said second bridge circuitry to said second-bridge-circuitry power-active state.

7. Apparatus as claimed as claimed in claim 1, wherein said intra-bridge power control signals comprise intra-bridge quiescing handshaking signals to co-ordinate said first bridge circuitry and said second bridge circuitry switching from said communication open state to a communication quiesced state.

8. Apparatus as claimed in claim 7, wherein in response to a quiescence request originating within said first power domain when said first bridge circuitry and said second bridge circuitry are in said communication open state, said first bridge circuitry changes said intra-bridge transaction-active signal from indicating said transaction-active state to indicating a transaction-inactive state.

9. Apparatus as claimed in claim 8, wherein said quiescence request originating within said first power domain is sent from said first domain power controller to said first bridge circuitry.

10. Apparatus as claimed in claim 8, wherein said second bridge circuitry initiates sending of said intra-bridge quiescing handshake signals when said intra-bridge transaction-active signal from indicating said transaction-active state to indicating said transaction-inactive state.

11. Apparatus as claimed in claim 7, wherein in response to a quiescence request originating within said second power domain when said first bridge circuitry and said second bridge circuitry are in said communication open state, said second bridge circuitry initiates sending of said intra-bridge quiescing handshake signals.

12. Apparatus as claimed in claim 7, wherein said intra-bridge quiescing handshaking signals comprise a quiescing request signal sent from said second bridge circuitry to said first bridge circuitry to trigger said first bridge circuitry to switch to said communication quiesced state and a quiescing accept signal sent from said first bridge circuitry to said second bridge circuitry to indicate that said first bridge circuitry has switched to said communication quiesced state.

13. Apparatus as claimed in claim 12, wherein said intra-bridge power control signals include a quiescing deny signal sent from said first bridge circuitry to said second bridge circuitry to indicate a denial of said switch to said communication quiesced state when said first bridge circuitry is storing one or more transactions.

14. Apparatus as claimed in claim 7, wherein before completion of switching to said communication quiesced state said first bridge circuitry and said second bridge circuitry are moved into respective predetermined states.

15. Apparatus as claimed in claim 14, wherein
said first bridge circuitry comprises a first-in-first-out buffer to store said one or more pending transactions before sending to said second bridge circuitry and having a write pointer stored by said first bridge circuitry and a read pointer stored by said second bridge circuitry; and
said respective predetermined states correspond to resetting of said write pointer and said read pointer.

16. Apparatus as claimed in claim 15, wherein said write pointer and said read pointer are reset to zero values.

17. Apparatus as claimed as claimed in claim 1, wherein said first-domain power control signals and said second-domain power control signals respective indicate activity in said first bridge circuitry and said second bridge circuitry based upon presence of pending transactions within said bridge and independent of whether said first bridge circuitry and said second bridge circuitry are in said communication open state.

18. Apparatus as claimed in claim 1, wherein said intra-bridge power control signals comprise a transaction pending signal sent from said first bridge circuitry to said second bridge circuitry to indicate presence of pending transactions stored within said first bridge circuitry and yet to be sent to said second bridge circuitry.

19. Apparatus as claimed in claim 1, wherein said first bridge circuitry comprises bridge slave circuitry, said second bridge circuitry comprises bridge master circuitry, and said bridge master circuitry controls signal transfer timing for transactions passed from said bridge slave circuitry to said bridge master circuitry.

20. Apparatus as claimed in claim 1, wherein said first bridge circuitry and said second bridge circuitry accept quiescing requests received respectively from said first domain power controller and said second domain power controller without exchanging intra-bridge power control signals when no transactions have been sent from said first bridge circuitry to said second bridge since said first bridge circuitry was last in said first-bridge-circuitry power-inactive state.

21. Apparatus as claimed in claim 1, wherein said first power domain operates asynchronously with respect to said second power domain.

22. Apparatus as claimed in claim 1, wherein said first power domain and said second power domain are portions of an system-on-chip integrated circuit.

23. Apparatus for processing data comprising:
a first power domain;
a second power domain; and
means for passing transaction signals from said first power domain to said second power domain and comprising:
first bridge means within said first power domain for sending said transaction signals to said second power domain and switched between a first-bridge-means power-active state and a first-bridge-means power-inactive state using first-domain power control signals communicated with a first domain power controller; and
second bridge means within said second power domain for receiving said transaction signals and switched between a second-bridge-means power-active state and a second-bridge-means power-inactive state using second-domain power control signals communicated with a second domain power controller; wherein
said first bridge means and said second bridge means communicate using intra-bridge power control signals;
said intra-bridge power control signals comprise an intra-bridge transaction-active signal passed from said first bridge means to said second bridge means when said first bridge means is in said first-bridge-means power-active state to indicate a transaction-active state corresponding to said first bridge means having received one or more transactions to transfer to said second bridge means since said first bridge means was last in said first-bridge-means power-inactive state; and
said second bridge means is triggered by said intra-bridge transaction-active signal changing to indicate said transaction-active state to initiate switching of said first bridge means and said second bridge means to a communication open state to transfer the one or more transactions from said first bridge means to said second bridge means.

24. A method of operating an apparatus for processing data having a first power domain and a second power domain, said method comprising:
passing transaction signals with a bridge from said first power domain to said second power domain;

sending said transaction signals to said second power domain using first bridge circuitry within said bridge;

switching said first bridge circuitry between a first-bridge-circuitry power-active state and a first-bridge-circuitry power-inactive state using first-domain power control signals communicated with a first domain power controller;

receiving said transaction signals from said first power domain using second bridge circuitry within said bridge; and switching said second bridge circuitry between a second-bridge-circuitry power-active state and a second-bridge-circuitry power-inactive state using second-domain power control signals communicated with a second domain power controller; wherein communicate between said first bridge circuitry and said second bridge circuitry using intra-bridge power control signals; wherein said intra-bridge power control signals comprise an intra-bridge transaction-active signal passed from said first bridge circuitry to said second bridge circuitry when said first bridge circuitry is in said first-bridge-circuitry power-active state to indicate a transaction-active state corresponding to said first bridge circuitry having received one or more transactions to transfer to said second bridge circuitry since said first bridge circuitry was last in said first-bridge-circuitry power-inactive state; and triggering said second bridge circuitry by said intra-bridge transaction-active signal changing to indicate said transaction-active state to initiate switching of said first bridge circuitry and said second bridge circuitry to a communication open state to transfer the one or more transactions from said first bridge circuitry to said second bridge circuitry.

* * * * *